US010090976B2

United States Patent
Fodor et al.

(10) Patent No.: US 10,090,976 B2
(45) Date of Patent: Oct. 2, 2018

(54) USER EQUIPMENT, A NETWORK NODE AND METHODS THEREIN FOR ENABLING DEVICE-TO-DEVICE (D2D) COMMUNICATION IN A RADIO COMMUNICATIONS NETWORK

(71) Applicant: Telefonaktiebolaget L M Ericsson (publ), Stockholm (SE)

(72) Inventors: Gabor Fodor, Hasselby (SE); Chrysostomos Koutsimanis, Solna (SE); Govardhan Madhugiri, Vällingby (SE); Per Skillermark, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 620 days.

(21) Appl. No.: 14/368,594

(22) PCT Filed: Apr. 30, 2014

(86) PCT No.: PCT/SE2014/050542
§ 371 (c)(1),
(2) Date: Jun. 25, 2014

(87) PCT Pub. No.: WO2015/167383
PCT Pub. Date: Nov. 5, 2015

(65) Prior Publication Data
US 2015/0319738 A1    Nov. 5, 2015

(51) Int. Cl.
*H04W 72/04*    (2009.01)
*H04L 5/00*    (2006.01)
(Continued)

(52) U.S. Cl.
CPC .......... *H04L 5/0048* (2013.01); *H04L 5/0007* (2013.01); *H04W 24/10* (2013.01);
(Continued)

(58) Field of Classification Search
CPC . H04W 72/042; H04W 24/10; H04W 76/023; H04L 5/007; H04L 5/0048
See application file for complete search history.

(56) References Cited

U.S. PATENT DOCUMENTS

2010/0165882 A1    7/2010  Palanki et al.
2013/0308551 A1*   11/2013 Madan .............. H04W 72/0406
                                                        370/329
(Continued)

FOREIGN PATENT DOCUMENTS

WO    2015112065 A1    7/2015

OTHER PUBLICATIONS

Fodor, G. et al., "Design Aspects of Network Assisted Device-to-Device Communications," IEEE Communications Magazine, Mar. 2012, pp. 170-177.
(Continued)

*Primary Examiner* — Noel R Beharry
*Assistant Examiner* — Ruihua Zhang
(74) *Attorney, Agent, or Firm* — Sage Patent Group (57) ABSTRACT

A method performed by a first User Equipment, UE, for enabling Device-to-Device, D2D, communication with a second UE in a radio communications network is provided. The first UE is configured to perform the D2D communication on downlink cellular resources in the radio communications network. The first UE measures received signal strengths of Reference Signals, RS, on downlink cellular resources from one or more network nodes in the radio communications network. The first UE then determines a first subset of downlink cellular resources for which the measured received signal strength of RS is above or equal to a threshold value. Also, the network node transmits information indicating the determined first subset of downlink cellular resources to a network node serving the first UE in the radio communications network in order to enable the D2D communication.

24 Claims, 6 Drawing Sheets

(51) Int. Cl.
*H04W 24/10* (2009.01)
*H04W 76/14* (2018.01)
*H04W 72/02* (2009.01)
*H04W 72/08* (2009.01)

(52) U.S. Cl.
CPC ........... *H04W 72/02* (2013.01); *H04W 76/14* (2018.02); *H04W 72/085* (2013.01)

(56) References Cited

U.S. PATENT DOCUMENTS

| | | | |
|---|---|---|---|
| 2013/0322276 A1 | 12/2013 | Pelletier et al. | |
| 2013/0322413 A1* | 12/2013 | Pelletier | H04W 72/1289 370/336 |
| 2014/0003262 A1* | 1/2014 | He | H04W 28/08 370/252 |
| 2014/0148182 A1* | 5/2014 | Jeong | H04L 5/0026 455/452.1 |
| 2014/0328299 A1* | 11/2014 | Kalhan | H04W 76/023 370/329 |
| 2015/0146633 A1* | 5/2015 | Kalhan | H04L 1/1607 370/329 |

OTHER PUBLICATIONS

International Search Report and Written Opinion for PCT/SE2014/050542, dated Feb. 26, 2015, 10 pages.

* cited by examiner

USER EQUIPMENT, A NETWORK NODE AND METHODS THEREIN FOR ENABLING DEVICE-TO-DEVICE (D2D) COMMUNICATION IN A RADIO COMMUNICATIONS NETWORK

This application is a 35 U.S.C. § 371 national phase filing of International Application No. PCT/SE2014/050542, filed Apr. 30, 2014, the disclosure of which is incorporated herein by reference in its entirety.

TECHNICAL FIELD

Embodiments herein relate to Device-to-Device, D2D, communication between user equipments in a radio communications network. In particular, embodiments herein relate to a user equipment, a network node and methods therein for enabling D2D communication in a radio communications network.

BACKGROUND

In a typical radio communications network, wireless terminals, also known as mobile stations, terminals and/or user equipments, UEs, communicate via a Radio Access Network, RAN, to one or more core networks. The radio access network covers a geographical area which is divided into cell areas, with each cell area being served by a base station, e.g. a radio base station, RBS, or network node, which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially flat rather than hierarchical architecture comprising radio base station nodes without reporting to RNCs.

Device-to-Device, D2D, communication, as an underlay to cellular networks, has been proposed as a means to take advantage of the close proximity of communicating devices, i.e. UEs, and at the same time to allow these UEs to operate in a controlled interference environment. In this case, close proximity may typically refer to less than a few tens of meters, but sometimes even up to a few hundred meters. This D2D or direct mode communication may demonstrate a number of potential gains over traditional cellular communication. One of these potential gains is capacity. For example, radio resources, such as, e.g. Orthogonal Frequency-Division Multiplexing, OFDM, resource blocks, between the D2D and cellular layers may be reused, resulting in reuse gains.

In cellular or radio communications networks with integrated D2D communication capabilities, the coexistence of cellular and D2D communication should be facilitated. This is particularly important when D2D communication is introduced gradually to evolving cellular or radio communications networks when legacy UEs continue to be served for a long time after D2D capable UEs are introduced in commercial cellular or radio communications networks.

For example, when cellular downlink resources in the cellular or radio communications networks are used for D2D communication, the impact of the D2D activities on cellular downlink transmissions must be controlled and vice versa; this in order for the D2D communications to not harmfully impact the cellular downlink transmissions, and for the cellular downlink transmissions to not harmfully impact the D2D communications. This kind of co-existence requires that both idle and active mode UEs are protected and must be guaranteed also for legacy cellular UEs that are unaware of any potential D2D communications. It is especially important to protect the various measurements that the UEs perform in both idle and active mode for the purpose of, for example, cell association, cell reselection, radio link monitoring, Radio Resource Management, RRM, and Channel State Information, CSI, estimation.

Furthermore, cellular or radio communications networks, such as, for example, a 3GPP Long Term Evolution, LTE, network, are normally deployed and operated using different configurations and setups. This may include support of different LTE Transmission Modes, TMs, such as, for example, TM4, TM9, and TM10, which require dissimilar set of Reference Signals, RS, for proper operation. Here, another aspect which needs to be considered is whether or not neighboring cells and/or sites are time synchronized, and may be also time-aligned. A further aspect to consider is also whether the downlink Cell specific Reference Signal, CRS, planning is shifted or un-shifted.

D2D Communications in the Cellular Spectrum

Allowing D2D communications in the cellular spectrum of cellular or radio communications networks is a means of increasing the spectrum utilization. This is because a pair of UEs communicating in a D2D mode may then reuse the cellular spectrum resources, such as, for example, Physical Resource Blocks, PRBs, of a LTE network.

When D2D communications use the downlink, DL, resources of a cellular or radio communications network, existing RRM techniques may protect the PRBs used for DL cellular transmissions of user data. In this way, user specific RSs, such as, e.g. DM-RSs used for demodulation and transmitted within the same PRBs as the user data, are automatically protected as well. These techniques are possible since in cellular integrated D2D communications, i.e. in cellular or radio communications networks with integrated D2D communication capabilities, the network node schedules and/or grants access to resources used for both D2D and cellular transmissions. Similarly, the D2D communications may be protected from cellular downlink data transmissions, e.g. data transmitted on the Physical Downlink Shared CHannel, PDSCH, by means of the network node scheduling D2D and cellular data transmissions on orthogonal resources or PRBs.

To protect cellular downlink RS that are mandatory, such as, e.g. CRS, CSI-RS, and CSI-Interference Measurement, CSI-IM, is more challenging as these mandatory signals are regularly transmitted over the entire frequency band. Similarly, existing RRM techniques do not automatically protect the D2D communication from the cellular downlink reference signals. It may be noted that CRS transmission is mandatory in all LTE networks, whereas CSI-RS and CSI-IM are mandated only for certain TMs, such as, e.g. TM9 and TM10.

RS in Cellular or Radio Communications Networks

In virtually all cellular or radio communications networks, downlink pilots or RSs of predefined and known characteristics, are regularly transmitted in the downlink by, e.g. Access Points, APs, or network nodes. The downlink pilots or RSs are used, e.g. measured, by both idle and active UEs for the purpose of, for example, mobility measurements, cell association, and as reference for CSI estimation and data demodulation. In the case of LTE Release 8 network, some of the RSs are called Cell specific Reference Signals, CRSs. CRSs have a predefined pattern that cover the entire frequency band and are transmitted four times per millisecond, i.e. for two antenna ports.

Figure 1:
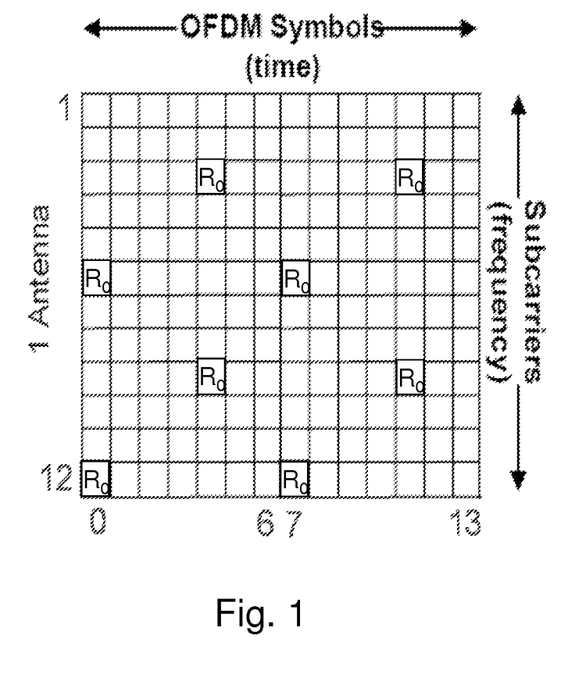
FIG. 1 is a schematic illustration of a set of resources in the OFDM grid depicting a cell specific antenna configuration for a one-antenna port.
Figure 2:
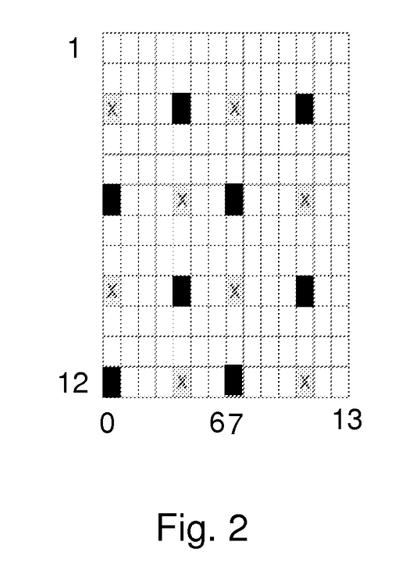
FIG. 2 is a schematic illustration of a set of resources in the OFDM grid depicting a cell specific antenna configuration for a two-by-two-antenna port.

FIGS. 1-2 show examples of the CRS arrangements in such a LTE Release 8 network. In more detail, FIG. 1 shows a schematic illustration of a PRB depicting a cell specific antenna configuration for a one-antenna port, whereas FIG. 2 shows a schematic illustration of a PRB depicting a cell specific antenna configuration for a two-by-two-antenna port. Here, it may be noted that a PRB is composed by 7 OFDM symbols in the time domain, and 12 subcarriers, i.e. 180 kHz, in the frequency domain, thus comprising 84 so called Resource Elements, REs, in the Orthogonal Frequency-Division Multiplexing, OFDM, time-frequency grid. Some of the REs are reserved to carry RS, such as, the REs marked $R_0$ in FIG. 1 for one antenna port and the REs marked with an "x" or blackened in FIG. 2 for two antenna ports. Hereinafter, the set of time-frequency positions or indices of the REs used for RSs may be referred to as a RS pattern.

Other examples are the CSI-RSs introduced in the DL of LTE Release 10 networks which serve the purpose of helping the UE to estimate the CSI for multiple cells rather than just the serving cell, and CSI-IMs introduced in the DL of LTE Release 11 networks which are used for inter-cell interference estimation. Other cellular and wireless radio communication technologies, such as, e.g. Wide band Code Division Multiple Access, WCDMA, High Speed Packet Access, HSPA, WiMax, etc., normally provide a similar type of pilot or reference signals to support e.g. mobility measurements, channel state dependent algorithms, and/or demodulation of control and data information.

Furthermore, cellular or radio communications networks may employ different strategies for the arrangements of RS in the time-, frequency-, code- and antenna port domains. For example, in OFDM, RS may be arranged according to the so called block type, comb type or some other RS patterns, such as, e.g. the RS pattern shown in FIG. 1. The exact pattern of the RSs in time and frequency may be optimized for different objectives, and it also affects how the receiver of the RS, e.g. a cellular UE, may use time and/or frequency domain interpolations to estimate the actual CSI for demodulation or other purposes. For example, a UE may weigh in RS measurements from the past or in other frequencies than at which the actual CSI is needed at a given point in time.

From the discussion above, it may be concluded that existing solutions in a cellular or radio communications network do not facilitate a safe introduction of D2D communication in DL cellular resources that are also used for cellular communication by legacy UEs.

SUMMARY

It is an object of embodiments herein to improve D2D communications on DL cellular resources in a radio communications network.

According to a first aspect of embodiments herein, the object is achieved by a method performed by a first User Equipment, UE, for enabling Device-to-Device, D2D, communication with a second UE in a radio communications network. The first UE is configured to perform the D2D communication on downlink cellular resources in the radio communications network. The first UE measures received signal strengths of Reference Signals, RS, on the downlink resources from one or more network nodes in the radio communications network. The first UE then determines a first subset of downlink cellular resources for which the measured received signal strength of RS is above or equal to a threshold value. Also, the first UE transmits information indicating the determined first subset of downlink cellular resources to a network node serving the first UE in the radio communications network in order to enable the D2D communication.

According to a second aspect of embodiments herein, the object is achieved by a first UE for enabling D2D communication with a second UE in a radio communications network. The first UE is configured to perform the D2D communication on downlink cellular resources in the radio communications network. The first UE is further configured to measure received signal strengths of RS on the downlink resources from one or more network nodes in the radio communications network. Also, the first UE is configured to determine a first subset of downlink cellular resources for which the measured received signal strength of RS is above or equal to a threshold value. The first UE is then also configured to transmit information indicating the determined first subset of downlink cellular resources to a network node serving the first UE in the radio communications network in order to enable the D2D communication.

According to a third aspect of embodiments herein, the object is achieved by a method performed by a network node for enabling D2D communication between a first and a second UE in a radio communications network. The network node is configured to assist the D2D communication by assigning downlink cellular resources in the radio communications network to the D2D communication. The network node receives, from the first UE, information indicating a first subset of downlink cellular resources of the downlink resources. Then, the network node is configured to determine a second subset of downlink cellular resources of the downlink resources that is orthogonal to the received first subset of downlink cellular resources, which said second subset of downlink cellular resources is to be used by the first UE in the D2D communication with the second UE. After the configuration, the network node is configured to transmit information indicating the determined second subset of downlink cellular resources to at least the first UE.

According to a fourth aspect of embodiments herein, the object is achieved by a network node for enabling D2D communication between a first and a second UE in a radio communications network. The network node is configured to assist the D2D communication by assigning downlink cellular resources in the radio communications network to the D2D communication. The network node is further configured to receive, from the first UE, information indicating of a first subset of downlink cellular resources of the downlink resources. The network node is also configured to determine a second subset of downlink cellular resources of the downlink resources that is orthogonal to the received first subset of downlink cellular resources, which said second subset of downlink cellular resources is to be used by the first UE in the D2D communication with the second UE. Then, the network node is configured to transmit information indicating the determined second subset of downlink cellular resources to at least the first UE.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By having a UE that intends to engage in D2D communication on DL cellular resources in a radio communications network measure signal strengths of the RSs received from surrounding network nodes and reporting the DL cellular resources corresponding to these RSs to a network node serving the current cell of the UE, the network node is able to return a recommended set of DL resources that is orthogonal to the reported DL resources to be used for the D2D communication. By using this recommended set of DL resources when performing its D2D communication, the UE may avoid any mutual, uncontrolled interference between the cellular RS transmissions in the radio communications network and the D2D communication.

Thus, a safe and controlled introduction of D2D communication in DL cellular resources, which are used by both D2D capable UEs and legacy UEs, is provided. Hence, D2D communications on DL cellular resources in a radio communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 3:
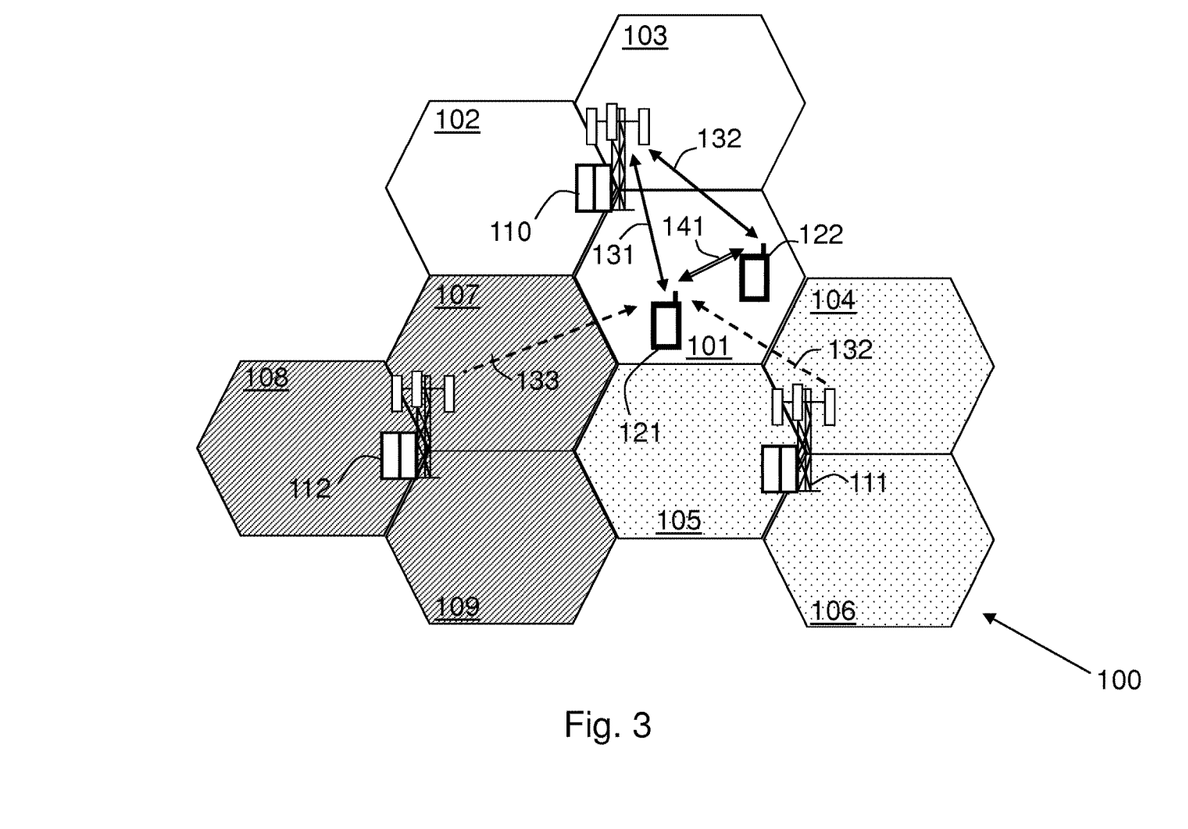
FIG. 3 is a schematic block diagram illustrating embodiments of user equipments and network nodes in a radio communications network.

FIG. 3 shows an example of a radio communication network 100 in which embodiments herein may be implemented. Although illustrated in FIG. 1 as an LTE network, the wireless communications network 100 may be any wireless communication system, such as, LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM network, or other 3GPP cellular network or system. The radio communications system 100 comprises network nodes 110-112.

Each of the network nodes 110-112 may e.g. be an eNodeB (eNB), or a Home Node B, a Home eNode B, femto Base Station (BS), pico BS or any other network unit capable to serve a user equipment in the radio communications system 100. The network nodes 110-112 may also be e.g. a base station controller, a network controller, a relay node, a repeater, an access point, a radio access point, a Remote Radio Unit (RRU) or a Remote Radio Head (RRH). Furthermore, the network nodes 110-112 each comprise one or more antennas for wireless radio communication with user equipments, UEs, located within their coverage range; that is, each of the network nodes 110-112 may use one or more of its antennas to provide radio coverage within its cells.

In the example shown in FIG. 3, the network nodes 110-112 are each configured to provide wireless radio coverage to UEs in each of its cells 101-103, 104-106, 107-109, respectively. The network nodes 110-112 may also be connected and configured to communicate with each other, e.g. over an X2 connection.

A cell may be seen as a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying each cell uniquely in the whole radio communication network 100 may also be broadcasted in the cell. The network node 110 communicates over the air or radio interface operating on radio frequencies with the UEs within range of the network node 110.

A first and a second user equipment, UE 121, 122 are located within the cell 101. The first and second UE 121, 122 are configured to communicate within the radio communications network 100 via the network node 110 over a radio link 131, 132 when present in the cell 101 served by the network node 110. The first and second UE 121, 122 may e.g. be any kind of wireless device such as a mobile phone, a cellular phone, a Personal Digital Assistant (PDA), a smart phone, a tablet, a sensor equipped with a UE, Laptop Mounted Equipment (LME) (e.g. USB), Laptop Embedded Equipment (LEE), Machine Type Communication (MTC) device, a UE with D2D capability, Customer Premises Equipment (CPE), etc. The first and second UE 121, 122 may also refer to a Machine-to-Machine, M2M, communication device that serves as a data communication modem or is built into equipment communicating data with a server without human interaction. Furthermore, the first and second UE 121, 122 are also capable of communicating with other user equipments, such as, e.g. each other, using direct wireless D2D communication. This may be performed over an established D2D link. This means that the first and second UE 121, 122 may discovery each other, establish a D2D communication, and perform D2D communication 141 in the radio communications network 100.

Here, the second user equipment 122 is shown located within the cell 101. However, according to other scenarios, the second user equipment 122 may also be located in another cell which is adjacent to the cell 101, e.g. cells 103, 104. It should also be noted that a large number of UEs may be located in the radio communication network 100. The first and second user equipments 121, 122 may be seen as one pair of UEs using D2D communication, i.e. a D2D pair of UEs, among many more D2D pairs of UEs in the radio communications network 100.

In the illustrated example shown in FIG. 3, DL transmissions by the network nodes 111, 112 in the cells 104, 107 may cause interference in the DL cellular spectrum for DL transmissions by the network node 110 in the cell 101 wherein the first and second UE 121, 122 are located. This is illustrated by the dashed arrows.

Although embodiments below are described with reference to the scenario of FIG. 1, this scenario should not be construed as limiting to the embodiments herein, but merely as an example made for illustrative purposes.

As part of developing the embodiments herein, it has been noticed that it is of value to have the possibility to introduce D2D communication in DL cellular spectrum in all kinds of radio communications network deployments, such as, for example, in different LTE networks, e.g. for different releases. Hence, it is desirable to have solutions that resolve the cellular and D2D coexistence problem in these different deployment types. More precisely, existing technologies do not protect the cellular downlink RSs from D2D transmissions. Similarly, D2D communication is also not automatically protected from cellular RS transmissions. Thus, there is a risk of mutual, uncontrolled interference in between cellular RS transmissions and D2D communication.

In accordance with embodiments described herein, this issue is addressed by having the coexistence of cellular and D2D communications assured by means of creating a set of DL cellular resources to be used for a D2D communication, e.g. in the form of a D2D Resource Element, RE, pattern in the OFDM time-frequency grid in LTE, that is orthogonal to the DL cellular resources used for mandatory cellular RS transmissions in the radio communications network, i.e. the cellular RE pattern used for cellular DL RSs in the OFDM time-frequency grid in LTE.

Example of embodiments of a method performed by a first UE 121 for enabling D2D communication 141 with a second UE 122 in a radio communications network 100, will now be described with reference to the flowchart depicted in FIG. 4. The first UE 121 is configured to perform the D2D communication 141 on downlink cellular resources in the radio communications network 100. The first UE may here be the receiving UE of the D2D pair of UEs, i.e. the first and second UE 121, 122, and may also be referred to as the victim UE. This means that the method may be performed, for example, by D2D capable UEs that intend to receive D2D RS and/or intend to engage in D2D communications using DL cellular REs.

Figure 4:
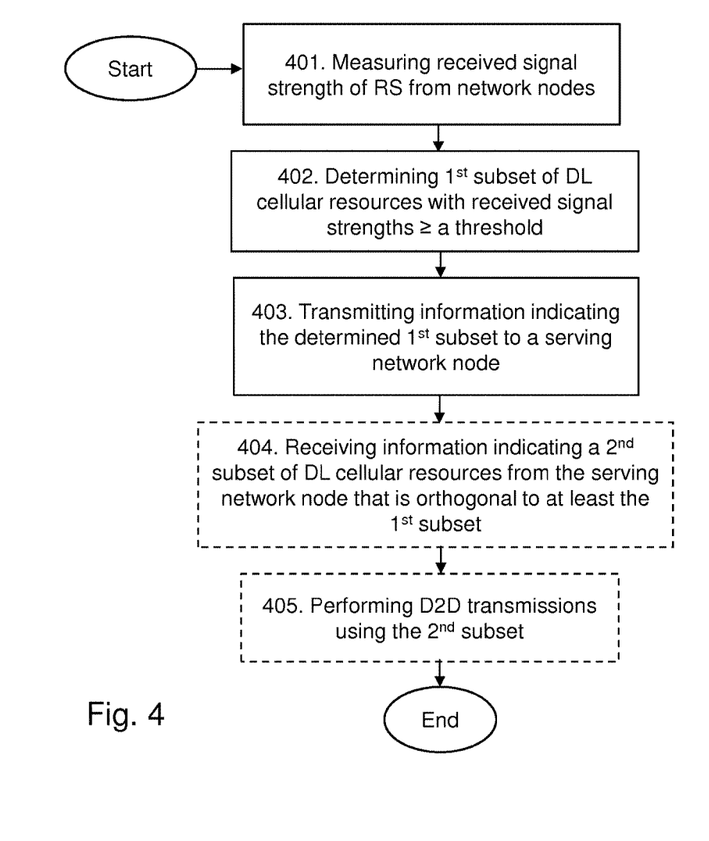
FIG. 4 is a flowchart depicting embodiments of a method in a user equipment.

FIG. 4 is an illustrated example of actions or operations which may be taken by the first UE 121. The method may comprise the following actions.

Action 401

In this action, the first UE 121 measure received signal strength of Reference Signals, RS, from network nodes. This means that the first UE 121 may measure received signal strengths of Reference Signals, RS, on the downlink cellular resources from one or more network nodes 110, 111, 112 in the radio communications network 100.

The first UE 121 may measure the strength of the surrounding cells through standardized cellular measurements. One example of such a standardized measurement in LTE is the DL Reference Signal Received Power, RSRP. The DL RSRP corresponds to the received signal strength from a network node 110, 111, 112. It is normally used, for example, for cell selection and cell reselection, etc.

Action 402

Based on the measurements in Action 401, the first UE 121 determines a first subset of downlink, DL, cellular resources with received signal strengths that are above or equal to a threshold. This means that the first UE 121 may determine a first subset of downlink cellular resources for which the measured received signal strength of RS is above or equal to a threshold value.

In some embodiments, the first UE 121 may determine which neighbouring network nodes or cells provide a signal strength level above a certain threshold. This may be performed per Resource Element, RE, in the OFDM time-frequency grid. For example, this may be the case for the neighboring network nodes 111, 112, or cells 104, 107 in the example of FIG. 3. By doing so, the first UE 121 may identify the set of the strongest interfering network nodes or cells for the first UE 121 in the cell 101 served by the network node 110. In particular, the first UE 1 may also identify the set of REs on which the first UE 121 experiences strong interference, i.e. equal to or above some configured threshold level, caused by RS used by these interfering neighboring network nodes in the cells, such as, e.g. cells 104, 107 as illustrated in the example of FIG. 3.

Alternatively, in some embodiments, the first UE 121 may determine, for each of the strongest interfering cells 104, 107 (which may also comprise the serving cell 101), the average received signal strength of each potential RS pattern, i.e. set of REs, that this set of strongest interfering cells 104, 107 might be using. In case the radio communications network is using LTE technology, the first UE 121 is typically informed, through RRC signalling, of the LTE standard release of the cell 101 that the first UE 121 has connected to. Thus, the first UE 121 is informed of all the RS patterns, i.e. set of REs, that the cell 101 might be using. Moreover, the neighboring cells 104, 107 may typically use the same LTE standard release, which means that the neighboring cells 104, 107 will use similar RS patterns.

Based on this information, the first UE 121 may estimate the interference, not per RE or for all REs, but on the determined RS patterns, i.e. the determined sets of REs which corresponds to the RS patterns. The first UE 121 may then calculate an average of the received signal strength for each of these potential RS patterns, i.e. the average value of the received signal strength over the set of PRBs that are part of a specific potential RS pattern. Hence, the first UE 121 may select the RS patterns which have the highest average value. By doing so, the first UE 121 may autonomously identify the RS patterns used in the interfering cells, e.g. cells 104, 107 in the example of FIG. 3.

Hence, the first UE 121 may determine the first subset of downlink cellular resources as the set of REs comprised in these selected RS patterns. In the above embodiments, the first UE 121 may be said to determine explicit feedback information.

According to another alternative, in some embodiments, the first UE 121 may only determine which neighboring network nodes or cells, e.g. network nodes 111, 112 and/or cells 104, 107, provide a signal strength level above a certain threshold. By doing so, the first UE 121 may determine a set of network nodes or cells corresponding to its strongest interfering neighboring network nodes or cells, e.g. network nodes 111, 112 and/or cells 104, 107 in FIG. 3. Thus, in this embodiment, the first UE 121 may be said to determine implicit feedback information.

In the embodiments described, the threshold used for the received signal strength level may, for example, be an absolute or relative value set with respect to the received RS signal strength of its serving cell, i.e. cell 101.

Action 403

After the determination, the first UE 121 transmits information indicating the determined first subset to a serving network node. This means that the first UE 121 may transmit information indicating the determined first subset of downlink cellular resources to a network node 110 serving the first UE 121 in the radio communications network 100 in order to enable the D2D communication 141.

In some embodiments, the transmitted information may comprise the determined first subset of downlink cellular resources. In this case, once the first UE 121 has identified the RE positions of the RSs of each interfering cell, i.e. the RS patterns, the first UE 121 may construct a set of REs comprising the union of all those RE positions of the RS patterns. The first UE 121 may then transmit the constructed union set of REs to its serving network node, i.e. the network node 110. Based on this set of REs, the network node 110 is then able to construct a set of REs that is orthogonal to this set of REs. This orthogonal set of REs may also be referred to as a Device-to-Device Reference Signal, DDRS or D2D RS, pattern.

Alternatively, or additionally, the transmitted information may comprise the identities of one or more network nodes 110, 111, 112 providing RS on the determined first subset of downlink cellular resources. The identities of the one or more network nodes 110, 111, 112, may e.g. be indicated by the cell-IDs of the strongest interfering cells, e.g. cells 104, 107. This means that the first UE 121 has determined, in Action 402, a set of the strongest interfering network nodes or cells, e.g. network nodes 111, 112 and/or cells 104, 107.

This means that the network node 110 has information of the strongest, i.e. with respect to a threshold, interfering network nodes or cells for the first UE 121. Thus, the network node 110 may request, via e.g. an X2 interface in case of LTE, the configurations of all or a subset of the used RSs, e.g. CSI-RS positions, from these interfering network nodes or cells, e.g. the network nodes 111, 112 and/or cells 104, 107. Once the network node 110 has identified the RE positions of the RSs of each interfering cell, the network node 110 may construct a set comprising the union of all those RE positions. This union set of used RE positions is then the set with respect to which the network node 110 determines an orthogonal set. Hence, through this implicit information from the first UE 121, the network node 110 is able to construct an orthogonal set to form the DDRS, or D2D RS, pattern.

Figure 5:
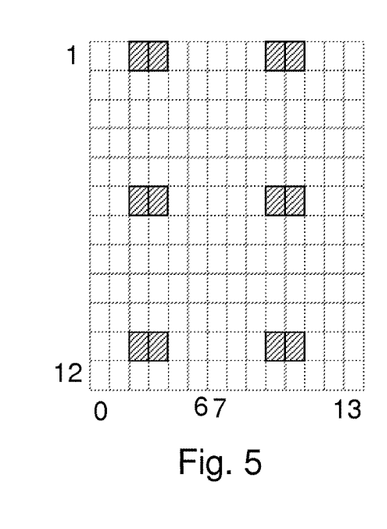
FIG. 5 is a schematic illustration depicting a set of resources in the OFDM grid according to embodiments of user equipments and network nodes.

FIG. 5 shows an example of an orthogonal set of REs, i.e. the dashed REs. According to embodiments herein, this D2D RE pattern may e.g. be used in CSI estimation for D2D communication of the first and second UE 121, 122. This orthogonal set of REs may easily be verified as orthogonal to e.g. the conventional set of REs used by Cell-specific Reference Signals, CRS, of the cellular UEs.

In some embodiments, the first UE 121 may also receive information indicating a third subset of downlink cellular resources from the second UE 122. In this case, the first UE 121 may also transmit the information indicating the third subset of downlink cellular resources received from the second UE 122 to the network node 110 serving the first UE 121. In some embodiments, this may be performed by the first UE 121 by sending the union of the first subset of downlink cellular resources and the third subset of downlink cellular resources to the network node 110.

Further, in some embodiments, the first UE 121 may also transmit information indicating the determined first subset of downlink cellular resources to the second UE 122. This may, for example, be performed in case the second UE 122 is served by another network node than the first UE 121, such as, e.g. one of the network nodes 111, 112.

Action 404

In this optional action, the first UE 121 receives information indicating a second subset of DL cellular resources from the serving network node that is orthogonal to the first subset. This means that the first UE 121 may receive, from the network node 110 serving the first UE 121, information indicating a second subset of downlink cellular resources that is orthogonal to at least the determined first subset of downlink cellular resources. This second subset of downlink cellular resources is to be used in the D2D communication 141 with the second UE 122. Thus, the first UE 121 may in this way be provided with a D2D RS, or DDRS, pattern to be used for the D2D communication with the second UE 122.

In some embodiments, in case a third subset of downlink cellular resources from the second UE 122 was transmitted to the network node 110 by the first UE 121, the second subset of downlink cellular resources may also be orthogonal to this third subset of downlink cellular resources.

In some embodiments, the information indicating a second subset of downlink cellular resources may comprise a time and/or frequency shift indication relative to at least one subset of downlink cellular resources preconfigured in the first UE 121. This means that the first UE 121 may receive a D2D RS pattern relative to a standardized cellular RS pattern. For example, the network node 110 may signal which cellular RS pattern is used as a baseline pattern for D2D RS to the first UE 121, and then signal a possible time and/or frequency shift relative to the baseline pattern for the D2D RS. Thus, the D2D RS pattern is here a shifted version of the baseline cellular RS pattern. In another example, the type of baseline cellular RS pattern used for D2D RS might be known to the first UE 121 and/or standardized for the first UE 121, so the first UE 121 need only receive the required time and/or frequency shift to be able to obtain orthogonality between the RS patterns.

In some embodiments, the information indicating a second subset of downlink cellular resources may comprise a reference index indicating a subset of downlink cellular resources from at least one subset of downlink cellular resources preconfigured in at least the first UE 121. This means that the first UE 121 may receive an index to a predetermined D2D RS configuration. In this case, one or more predetermined D2D RS configurations may be known to the first UE 121. The D2D RS configurations may, for example, be standardized in similar ways as the RS patterns used by the cellular UEs, such as, e.g. for CRS, Demodulation Reference Signals, DMRS, etc. The D2D RS configurations in the first UE 121 may also comprise e.g. information on the exact position of the D2D RS REs in the OFDM time-frequency grid; time periods, such as, e.g. how often the D2D RS REs occur in time; and if the D2D RS REs will go through any processing in the transmitter of the first UE 121 when transmitted, such as, e.g. if they are pre-coded or not.

In some embodiments, the information indicating a second subset of downlink cellular resources may comprise position indices of the resources in the second subset of downlink cellular resources to be used in the D2D communication 141 with the second UE 122. The position indices may, for example, be a pair of time/frequency indices, e.g. indicating one or more PRBs in case of LTE, or they may be flat (numerical) indices pointing to the exact REs occupied by the preconfigured D2D RS pattern.

In some embodiments, the at least one subset of downlink cellular resources to be preconfigured in the first UE 121 is received in the first UE 121 as part of system information broadcasted by the network node 110 serving the first UE 121.

In some embodiments, the information indicating the second subset of downlink cellular resources comprises information indicating at least one subset of downlink cellular resources indicating resources to be used for transmitting RS in the D2D communication 141 with the second UE 122, and at least one subset of downlink cellular resources indicating resources to be used for transmitting payload data in the D2D communication 141 with the second UE 122. By signalling two sets of D2D patterns, i.e. one for the D2D RS signalling and one for the D2D data transmissions, the ability of protecting also D2D data transmissions from cellular UE RS transmissions is achieved.

Figure 6:
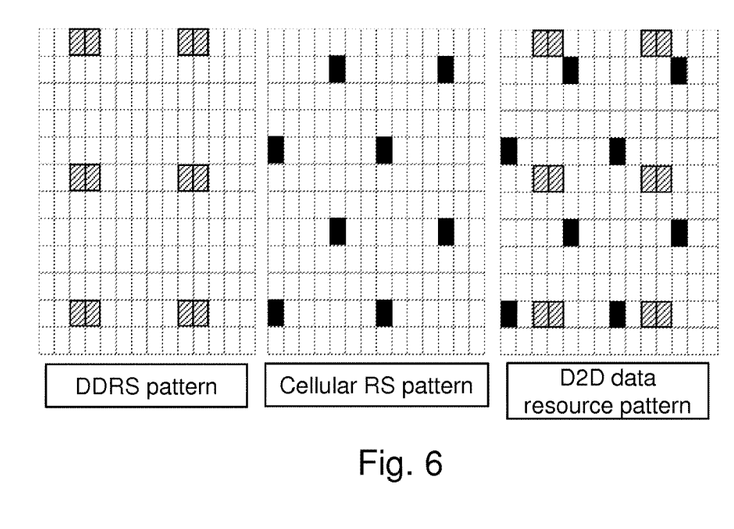
FIG. 6 is another schematic illustration depicting a set of resources in the OFDM grid according to embodiments of user equipments and network nodes.

FIG. 6 shows examples of a D2D RS, or DDRS, RE pattern, a cellular RS RE pattern and a D2D data RE pattern, which are orthogonal with respect to each other. Here, the REs of the D2D RS pattern, i.e. the dashed REs, are to be used by the first and second UEs 121, 122 for RS signalling in the D2D communication. The cellular RS RE pattern, i.e. fully filled REs, indicate REs which is not to be used by the first and second UEs 121, 122 in the D2D communication, since they may comprise RS signalling of other cellular UEs. The REs of the D2D data pattern, i.e. the blank REs in the rightmost illustration in FIG. 6, indicate the REs which may be used by the first and second UE 121, 122 to transmit D2D data in the D2D communication.

Action 405

In this optional action, the first UE 121 performs D2D transmissions using the second subset. This means that the first UE 121 may perform D2D communication 141 with the second UE 122 using the second subset of downlink cellular resources.

Example of embodiments of a method performed by a network node 110 for enabling D2D communication 141 between a first and a second UE 121,122 in a radio communications network 100, will now be described with reference to the flowchart depicted in FIG. 7. The network node 110 is configured to assist the D2D communication 141 by assigning downlink cellular resources in the radio communications network 100 to the D2D communication.

Figure 7:
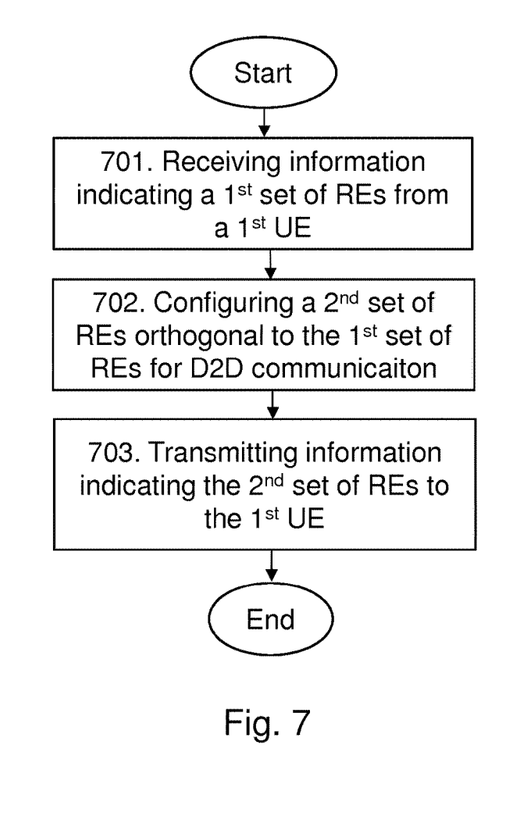
FIG. 7 is a flowchart depicting embodiments of a method in a network node.

FIG. 7 is an illustrated example of actions or operations which may be taken by any one of the network nodes 110-112. However, it should also be noted that these actions or operations may also be performed by a centralized network node in the radio communications network 100, such as, e.g. a core network node, a radio network controller, a Radio Resource Management, RRM, server, an Operations Support System, OSS, node or the like. The centralized network node may also be e.g. an eNB controlling distributed Remote Radio Units, RRUs, via e.g. a Common Public Radio Interface, CPRI, or an eNB controlling radio heads over an active Distributed Antenna System, DAS, network. The method may comprise the following actions.

Action 701

In this action, the network node 110 receives, from the first UE 121, information indicating a first subset of downlink cellular resources of the downlink cellular resources. In some embodiments, the received information may comprise the first subset of downlink cellular resources. Alternatively, or additionally, the received information may comprise the identities of one or more network nodes 110, 111, 112 providing Reference Signals, RS, on the first subset of downlink cellular resources.

In some embodiments, the network node 110 may also receive information indicating a third subset of downlink cellular resources from the second UE 122. In some embodiments, a union of the first subset of downlink cellular resources and the third subset of downlink cellular resources may be received by the network node 110.

Action 702

After receiving the first subset of downlink cellular resources, the network node 110 determines a second subset of downlink cellular resources of the downlink cellular resources that is orthogonal to the received first subset of downlink cellular resources, which said second subset of downlink cellular resources is to be used by the first UE 121 in the D2D communication with the second UE 122.

In some embodiments, in case the received information in Action 701 comprise the identities of the one or more network nodes 110, 111, 112, the network node 110 may perform signalling with the one or more network nodes 110, 111, 112 to determine the downlink cellular resources on which the one or more network nodes 110, 111, 112 transmit RS. Here, the network node 110 may request, via e.g. an X2 interface in case of LTE, the configurations of all or a subset of the used RSs, e.g. CSI-RS positions, from the interfering network nodes or cells, e.g. the network nodes 111, 112 and/or cells 104, 107. This since the information received from the first UE 121 indicates the strongest, i.e. with respect to a threshold, interfering network nodes or cells for the first UE 121. Once the network node 110 has identified the RE positions of the RSs of each interfering cell, the network node 110 may construct a set comprising the union of all those RE positions. This union set of used RE positions is then the set with respect to which the network node 110 determines an orthogonal set. Hence, the network node 110 may determine the second subset of downlink cellular resources such that it is orthogonal to the determined downlink cellular resources on which the one or more network nodes 110, 111, 112 transmit RS.

In case the network node 110 receives information indicating a third subset of downlink cellular resources from the second UE 122 in Action 701, the network node 110 may here determine the second subset of downlink cellular resources such that it is orthogonal to both the first and third received subsets of downlink cellular resources.

Action 703

In this action, the network node 110 transmits information indicating the determined second subset of downlink cellular resources to at least the first UE 121.

This second subset of DL cellular resources, i.e. DDRS or D2D RS pattern, in terms of the specific REs to be used for the D2D communication with the second UE 122 may be indicated by the network node 110 at the time of D2D communication establishment and at mode selection signalling. This second subset of DL cellular resources may be used for the entire session of the D2D communication, e.g. over a time span of 500 ms. This second subset of DL cellular resources may easily also be incorporated as an Information Element, IE, in the mode selection signalling.

This second subset of DL cellular resources may be transmitted by the network node 110 to the first UE 121 using DL cellular communication, e.g. by means of Radio Resource Control, RRC, signalling either prior to mode selection or in conjunction with signalling a mode selection decision to the first UE 121.

In some embodiments, the information indicating a second subset of downlink cellular resources may comprise a time and/or frequency shift indication relative to at least one subset of downlink cellular resources preconfigured in the first and/or second UE 121. In some embodiments, the information indicating a second subset of downlink cellular resources may comprise a reference index indicating a subset of downlink cellular resources from at least one subset of downlink cellular resources preconfigured in at least the first and/or second UE 121. In some embodiments, the information indicating a second subset of downlink cellular resources may comprise position indices of the resources in the second subset of downlink cellular resources to be used in the D2D communication 141.

In some embodiments, the network node 110 may transmit the at least one subset of downlink cellular resources to be preconfigured in the first and/or second UE 121 as part of system information broadcasted by the network node 110 serving the first and/or second UE 121. In this way, the network node 110 may preconfigure the first and/or second UE 121 with the at least one subset of downlink cellular resources. According to one example, this may be performed by the broadcasted system information comprising an indication of a subset of downlink cellular resources to be used from one or more subsets of downlink cellular resources already preconfigured in the first and/or second UE 121.

In some embodiments, the information indicating the second subset of downlink cellular resources may comprise information indicating at least one subset of downlink cellular resources indicating resources to be used for transmitting RS in the D2D communication 141, and at least one subset of downlink cellular resources indicating resources to be used for transmitting payload data in the D2D communication 141.

Figure 8:
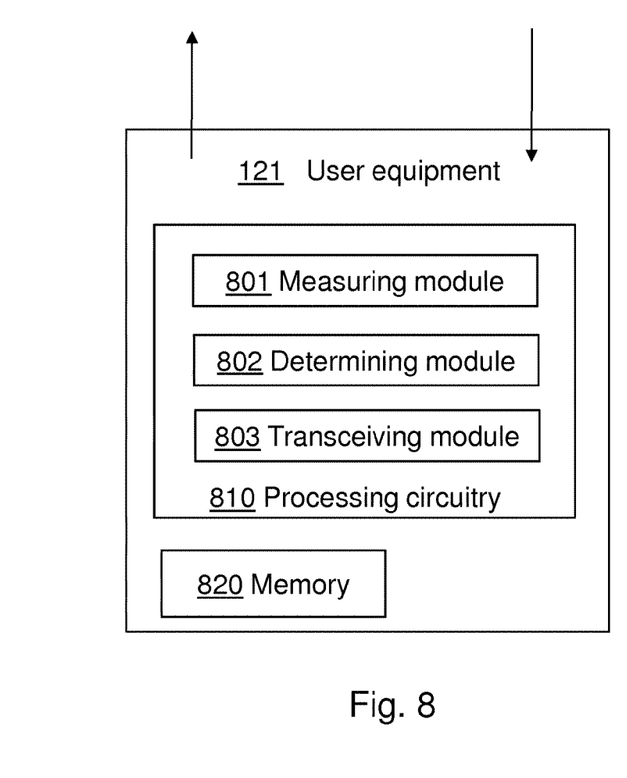
FIG. 8 is a schematic block diagram depicting embodiments of a user equipment.

To perform the method actions in the first UE 121 for enabling D2D communication 141 with a second UE 122 in a radio communications network 100, the first UE 121 may comprise the following arrangement depicted in FIG. 8. The first UE 121 is configured to be in a wireless communications network, such as, e.g. the radio communications network 100 in FIG. 1. The first UE 121 is also configured to perform the D2D communication 141 on downlink cellular resources in the radio communications network 100.

FIG. 8 shows a schematic block diagram of embodiments of the first UE 121. In some embodiments, the first UE 121 may comprise a measuring module 801, a determining module 802, and a transceiving module 803. In some embodiments, the first UE 121 may comprise a processing circuitry 810, which may also be referred to as processing module, processing unit or processor. The processing circuitry 810 may comprise one or more of the measuring module 801, determining module 802, and transceiving module 803, and/or perform the function thereof described below.

The first UE 121 is configured to, or comprises the measuring module 801 being configured to, measure received signal strengths of Reference Signals, RS, on the downlink cellular resources from one or more network nodes 110, 111, 112 in the radio communications network 100. Furthermore, the network node 110 is configured to, or comprises the determining module 802 being configured to, determine a first subset of downlink cellular resources for which the measured received signal strength of RS is above or equal to a threshold value. The first UE 121 is further configured to, or comprises the transceiving module 803 being configured to, transmit information indicating the determined first subset of downlink cellular resources to a network node 110 serving the first UE 121 in the radio communications network 100 in order to enable the D2D communication 141.

The transmitted information may, in some embodiments, comprise the determined first subset of downlink cellular resources. Alternatively, or additionally, the transmitted information may comprise the identities of the one or more network nodes 110, 111, 112 providing the RS on the determined first subset of downlink cellular resources.

In some embodiments, the first UE 121 or the transceiving module 803 may further configured to receive, from the network node 110 serving the first UE 121, information indicating a second subset of downlink cellular resources that is orthogonal to at least the determined first subset of downlink cellular resources. This second subset of downlink cellular resources is to be used in the D2D communication 141 with the second UE 122. Here, the first UE 121 or the transceiving module 803 may also be configured to perform D2D communication with the second UE 122 using the second subset of downlink cellular resources.

In some embodiments, the information indicating a second subset of downlink cellular resources may comprise one or more of: a time and/or frequency shift indication relative to at least one subset of downlink cellular resources preconfigured in the first UE 121; a reference index indicating a subset of downlink cellular resources from at least one subset of downlink cellular resources preconfigured in at least the first UE 121; and a position indices of the resources in the second subset of downlink cellular resources to be used in the D2D communication 141 with the second UE 122.

Furthermore, the first UE 121 or the transceiving module 803 may further be configured to receive the at least one subset of downlink cellular resources preconfigured in the first UE 121 as part of system information broadcasted by the network node 110 serving the first UE 121.

In some embodiments, the information indicating a second subset of downlink cellular resources may comprises information indicating at least one subset of downlink cellular resources indicating resources to be used for transmitting RS in the D2D communication 141 with the second UE 122, and at least one subset of downlink cellular resources indicating resources to be used for transmitting payload data in the D2D communication 141 with the second UE 122.

In some embodiments, the first UE 121 or the transceiving module 803 may further be configured to receive information indicating a third subset of downlink cellular resources from the second UE 122. In this case, the first UE 121 or the transceiving module 803 may be further configured to transmit the information indicating a third subset of downlink cellular resources received from the second UE 122 to the network node 110 serving the first UE 121.

In case the second UE 122 is served by another network node 111, 112 than the first UE 121, the first UE 121 or the transceiving module 803 may be further configured to also transmit information indicating the determined first subset of downlink cellular resources to the second UE 122.

The embodiments for enabling D2D communication 141 with a second UE 122 may be implemented through one or more processors, such as, e.g. the processing circuitry 810 in the first UE 121 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 810 in the first UE 121. The computer program code may e.g. be provided as pure program code in the first UE 121 or on a server and downloaded to the first UE 121. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The first UE 121 may further comprise a memory 820, which may be referred to or comprise one or more memory modules or units. The memory 8 may be arranged to be used to store executable instructions and data, such as, e.g. the first and second subset of downlink cellular resources, further subsets of downlink cellular resources, and/or one or more preconfigured subsets of downlink cellular resources, to perform the methods described herein when being executed in the first UE 121. Those skilled in the art will also appreciate that the processing circuitry 810 and the memory 820 described above may refer to a combination of analog and digital circuits, and/or one or more processors configured with software and/or firmware, e.g. stored in the memory 820, that when executed by the one or more processors such as the processing circuitry 810 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry or module 810, cause the at least one processor to carry out the method for enabling D2D communication 141 with a second UE 122. Also, some embodiments may, as described above, further comprise a carrier containing said computer program, wherein the carrier is one of an electronic signal, optical signal, radio signal, or computer readable storage medium.

Figure 9:
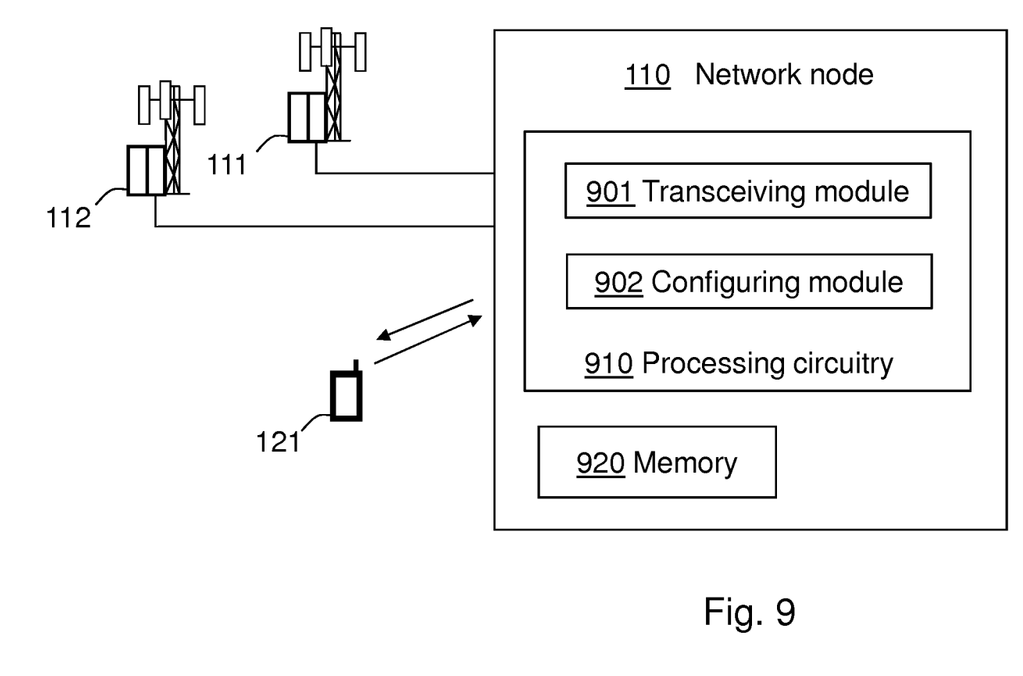
FIG. 9 is a schematic block diagram depicting embodiments of a network node.

To perform the method actions for enabling D2D communication 141 between a first and a second UE 121, 122 in a radio communications network 100, the network node 110 may comprise the following arrangement depicted in FIG. 9. The network node 110 is configured to be in a wireless communications network, such as, e.g. the radio communications network 100 in FIG. 1. The network node 110 is also configured to assist the D2D communication 141 by assigning downlink cellular resources in the radio communications network 100 to the D2D communication.

FIG. 9 shows a schematic block diagram of embodiments of the network node 110. In some embodiments, the network node 110 may comprise a transceiving module 901, and a configuring module 902. In some embodiments, the network node 110 may comprise a processing circuitry 910, which may also be referred to as processing module, processing unit or processor. The processing circuitry 910 may comprise one or more of the transceiving module 901 and the configuring module 902, and/or perform the function thereof described below.

The network node 110 is configured to, or comprises the transceiving module 901 being configured to, receive, from the first UE 121, information indicating of a first subset of the downlink cellular resources. Also, the network node 110 is configured to, or comprises the configuring module 902 being configured to, determine a second subset of downlink cellular resources of the downlink cellular resources that is orthogonal to the received first subset of downlink cellular resources, which said second subset of downlink cellular resources is to be used by the first UE 121 in the D2D communication 141 with the second UE 122. Furthermore, the network node 110 is configured to, or comprises the transceiving module 901 being configured to, transmit information indicating the determined second subset of downlink cellular resources to at least the first UE 121.

The received information may, in some embodiments, comprise the determined first subset of downlink cellular resources. Alternatively, or additionally, the received information may comprise the identities of the one or more network nodes 110, 111, 112 providing the RS on the determined first subset of downlink cellular resources.

In case the received information comprise the identities of the one or more network nodes 110, 111, 112, the network node 110 or the transceiving module 901 may be further configured to perform signalling with the one or more network nodes 110, 111, 112 to determine the downlink cellular resources on which the one or more network nodes 110, 111, 112 transmit RS. Here, the network node 110 or configuring module 902 may also be configured to determine the second subset of downlink cellular resources such that it is orthogonal to the determined downlink cellular resources on which the one or more network nodes 110, 111, 112 transmit RS.

In some embodiments, the network node 110 or the transceiving module 901 may be further configured to receive information indicating a third subset of downlink cellular resources from the second UE 122, and determine the second subset of downlink cellular resources such that it is orthogonal to both the first and third received subsets of downlink cellular resources.

In some embodiments, the information indicating the second subset of downlink cellular resources comprises one or more of: a time and/or frequency shift indication relative to at least one subset of downlink cellular resources preconfigured in the first and/or second UE 121; a reference index indicating a subset of downlink cellular resources from at least one subset of downlink cellular resources preconfigured in at least the first and/or second UE 121; and position indices of the resources in the second subset of downlink cellular resources to be used in the D2D communication 141. In some embodiments, the network node 110 or the transceiving module 901 may further be configured to transmit the at least one subset of downlink cellular resources to be preconfigured in the first and/or second UE 121 to the first and/or second UE 121 as part of a system information broadcast.

In some embodiments, the information indicating the second subset of downlink cellular resources comprises information indicating at least one subset of downlink cellular resources indicating resources to be used for transmitting RS in the D2D communication 141, and at least one subset of downlink cellular resources indicating resources to be used for transmitting payload data in the D2D communication 141.

The embodiments for enabling D2D communication 141 between a first and a second UE 121, 122 may be implemented through one or more processors, such as, e.g. the processing circuitry 910 in the network node 110 depicted in FIG. 9, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 910 in the network node 110. The computer program code may e.g. be provided as pure program code in the network node 110 or on a server and downloaded to the network node 110. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The network node 110 may further comprise a memory 920, which may be referred to or comprise one or more memory modules or units. The memory 620 may be arranged to be used to store executable instructions and data, such as, e.g. one or more subsets of downlink cellular resources to be preconfigured in the at least first UE 121, the received first subset of downlink cellular resources, the configured second subset of downlink cellular resources, subsets of downlink cellular resources received from other network nodes, etc., to perform the methods described herein when being executed in the network node 110. Those skilled in the art will also appreciate that the processing circuitry 910 and the memory 920 described above may refer to a combination of analog and digital circuits, and/or one or more processors configured with software and/or firmware, e.g. stored in the memory 920, that when executed by the one or more processors such as the processing circuitry 910 perform the method as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program, comprising instructions which, when executed on at least one processor, e.g. the processing circuitry or module 910, cause the at least one processor to carry out the method for enabling D2D communication 141 between a first and a second UE 121, 122. Also, some embodiments may, as described above, further comprise a carrier containing said computer program, wherein the carrier is one of an electronic signal, optical signal, radio signal, or computer readable storage medium.

The terminology used in the detailed description of the particular exemplary embodiments illustrated in the accompanying drawings is not intended to be limiting of the described the method and the network node 110, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previouslys mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

ABS Almost Blank Sub-frame
AWGN Additive White Gaussian Noise
CRS Cell Specific Reference Signal
CSI Channel State Information
CSI-RS Channel State Information Reference Signal
CSI-IM Channel State Information Interference Measurement
CQI Channel Quality Information
DL Downlink
DDRS Device-to-Device Reference Signal
ICIC Intercell Interference Coordination
IRC Interference Rejection Combining MMSE Minimum Mean Square Error
SIC Successive Interference Cancellation
MRC Maximum Ratio Combining
MU MIMO Multi-User Multiple Input Multiple Output
D2D Device-to-Device
OFDM Orthogonal Frequency Division Multiplexing
PDSCH PHY Downlink Shared Channel
PRB Physical Resource Block
RRC Radio Resource Control
RE Resource Element
RLM Radio Link Management
RRM Radio Resource Management
RX Receive
RSRP Reference Symbol Received Power
RSSI Received Signal Strength Indicator
TM Transmission Mode
Tx Transmit
UE User Equipment
UL Uplink

The invention claimed is:

1. A method performed by a first User Equipment, UE, for enabling Device-to-Device, D2D, communication with a second UE in a radio communications network, the first UE being configured to perform the D2D communication on downlink cellular resources in the radio communications network, the method comprising:
    measuring received signal strengths of Reference Signals, RS, on downlink cellular resources from one or more network nodes in the radio communications network;
    determining a first subset of downlink cellular resources for which the measured received signal strength of RS is above or equal to a threshold value;
    wherein the threshold value used for the received signal strength level is an absolute or relative value set with respect to the received RS signal strength of its serving cell;
    transmitting information indicating the determined first subset of downlink cellular resources to a network node serving the first UE in the radio communications network in order to enable the D2D communication;
    wherein the transmitted information indicating the determined first subset of downlink cellular resources comprises:
        identities of one or more network nodes providing RS on the determined first subset of downlink cellular resources; and
        identities of the one or more network nodes indicated by cell-IDs of strongest interfering cells;
    receiving, from the network node serving the first UE, information indicating a second subset of downlink cellular resources that is orthogonal to at least the determined first subset of downlink cellular resources, which said second subset of downlink cellular resources is to be used in the D2D communication with the second UE; and
    performing D2D communication with the second UE using the second subset of downlink cellular resources;
    wherein the information indicating the second subset of downlink cellular resources comprises one or more of:
        a reference index indicating a subset of downlink cellular resources from at least one subset of downlink cellular resources preconfigured in at least the first UE, and position indices of resources in the second subset of downlink cellular resources to be used in the D2D communication with the second UE.

2. The method according to claim 1, wherein the transmitted information comprise the determined first subset of downlink cellular resources and/or the identities of one or more network nodes providing RS on the determined first subset of downlink cellular resources.

3. The method according to claim 1, wherein the at least one subset of downlink cellular resources preconfigured in the first UE is received in the first UE as part of system information broadcasted by the network node serving the first UE.

4. The method according to claim 1, wherein the information indicating the second subset of downlink cellular resources comprises information indicating at least one subset of downlink cellular resources indicating resources to be used for transmitting RS in the D2D communication with the second UE, and at least one subset of downlink cellular resources indicating resources to be used for transmitting payload data in the D2D communication with the second UE.

5. The method according to claim 1, further comprising receiving information indicating a third subset of downlink cellular resources from the second UE, and transmitting the information indicating a third subset of downlink cellular resources received from the second UE to the network node serving the first UE.

6. The method according to claim 5, further comprising, in case the second UE is served by another network node than the first UE, transmitting information indicating the determined first subset of downlink cellular resources to the second UE.

7. A first User Equipment, UE, capable of enabling Device-to-Device, D2D, communication with a second UE in a radio communications network, the first UE being configured to perform the D2D communication on downlink cellular resources in the radio communications network,
    the first UE being configured to measure received signal strengths of Reference Signals, RS, of downlink cellular resources from one or more network nodes in the radio communications network,
    determine a first subset of downlink cellular resources for which the measured received signal strength of RS is above or equal to a threshold value, wherein the threshold value used for the received signal strength level is an absolute or relative value set with respect to the received RS signal strength of its serving cell,
    transmit information indicating the determined first subset of downlink cellular resources to a network node serving the first UE in the radio communications network in order to enable the D2D communication,
    receive, from the network node serving the first UE, wherein the transmitted information indicating the determined first subset of downlink cellular resources comprises:
        identities of one or more network nodes providing RS on the determined first subset of downlink cellular resources; and
        identities of the one or more network nodes indicated by cell-IDs of strongest interfering cells;
    information indicating a second subset of downlink cellular resources that is orthogonal to at least the determined first subset of downlink cellular resources, which said second subset of downlink cellular resources is to be used in the D2D communication with the second UE, and perform D2D communication with the second UE using the second subset of downlink cellular resources;
    wherein information indicating a second subset of downlink cellular resources comprises one or more of:

a reference index indicating a subset of downlink cellular resources from at least one subset of downlink cellular resources preconfigured in at least the first UE, and position indices of resources in the second subset of downlink cellular resources to be used in the D2D communication with the second UE.

8. The first UE according to claim 7, wherein the transmitted information comprise the determined first subset of downlink cellular resources and/or the identities of the one or more network nodes providing the RS on the determined first subset of downlink cellular resources.

9. The first UE according to claim 7, wherein the at least one subset of downlink cellular resources preconfigured in the first UE is received in the first UE as part of system information broadcasted by the network node serving the first UE.

10. The first UE according to claim 7, wherein the information indicating a second subset of downlink cellular resources comprises information indicating at least one subset of downlink cellular resources indicating resources to be used for transmitting RS in the D2D communication with the second UE, and at least one subset of downlink cellular resources indicating resources to be used for transmitting payload data in the D2D communication with the second UE.

11. The first UE according to claim 7, further configured to receive information indicating a third subset of downlink cellular resources from the second UE, and transmit the information indicating a third subset of downlink cellular resources received from the second UE to the network node serving the first UE.

12. The first UE according to claim 11, further configured to, in case the second UE is served by another network node than the first UE, transmit information indicating the determined first subset of downlink cellular resources to the second UE.

13. A method performed by a network node for enabling Device-to-Device, D2D, communication between a first and a second User Equipment, UE in a radio communications network, the network node being configured to assist the D2D communication by assigning downlink cellular resources in the radio communications network to the D2D communication, the method comprising:
receiving, from the first UE, information indicating a first subset of downlink cellular resources;
determining a second subset of downlink cellular resources of the downlink cellular resources that is orthogonal to the received first subset of downlink cellular resources, which said second subset of downlink cellular resources is to be used by the first UE in the D2D communication with the second UE;
transmitting information indicating the determined second subset of downlink cellular resources to at least the first UE;
wherein the information indicating the second subset of downlink cellular resources comprises one or more of:
a reference index indicating a subset of downlink cellular resources from at least one subset of downlink cellular resources preconfigured in at least the first and/or second UE, and
position indices of resources in the second subset of downlink cellular resources to be used in the D2D communication.

14. The method according to claim 13, wherein the received information comprise the first subset of downlink cellular resources and/or the identities of one or more network nodes providing Reference Signals, RS, on the first subset of downlink cellular resources.

15. The method according to claim 13, wherein, in case the received information comprise the identities of the one or more network nodes, the determining further comprises performing signaling with the one or network nodes to determine the downlink cellular resources on which the one or more network nodes transmit RS, and determining the second subset of downlink cellular resources such that it is orthogonal to the determined downlink cellular resources on which the one or more network nodes transmit RS.

16. The method according to claim 13, wherein the receiving further comprises receiving information indicating a third subset of downlink cellular resources from the second UE, and the determining further comprises determining the second subset of downlink cellular resources such that it is orthogonal to both the first and third received subsets of downlink cellular resources.

17. The method according to claim 13, wherein the at least one subset of downlink cellular resources to be preconfigured in the first and/or second UE is transmitted to the first and/or second UE as part of a system information broadcast.

18. The method according to claim 13, wherein the information indicating the second subset of downlink cellular resources comprises information indicating at least one subset of downlink cellular resources indicating resources to be used for transmitting RS in the D2D communication, and at least one subset of downlink cellular resources indicating resources to be used for transmitting payload data in the D2D communication.

19. A network node capable of enabling Device-to-Device, D2D, communication between a first and a second User Equipment, UE in a radio communications network, the network node being configured to:
assist the D2D communication by assigning downlink cellular resources in the radio communications network to the D2D communication;
receive, from the first UE, information indicating of a first subset of downlink cellular resources;
determine a second subset of downlink cellular resources of the downlink cellular resources that is orthogonal to the received first subset of downlink cellular resources, which said second subset of downlink cellular resources is to be used by the first UE in the D2D communication with the second UE; and
transmit information indicating the determined second subset of downlink cellular resources to at least the first UE;
wherein the information indicating the second subset of downlink cellular resources comprises one or more of:
a reference index indicating a subset of downlink cellular resources from at least one subset of downlink cellular resources preconfigured in at least the first and/or second UE, and
position indices of the resources in the second subset of downlink cellular resources to be used in the D2D communication.

20. The network node according to claim 19, wherein the received information comprise the first subset of downlink cellular resources and/or the identities of one or more network nodes providing Reference Signals, RS, on the first subset of downlink cellular resources.

21. The network node according to claim 19, wherein, in case the received information comprise the identities of the one or more network nodes, the network node is further configured to perform signaling with the one or more network nodes to determine the downlink cellular resources on which the one or more network nodes transmit RS, and determine the second subset of downlink cellular resources such that it is orthogonal to the determined downlink cellular resources on which the one or more network nodes transmit RS.

22. The network node according to claim 19, further configured to receive information indicating a third subset of downlink cellular resources from the second UE, and determine the second subset of downlink cellular resources such that it is orthogonal to both the first and third received subsets of downlink cellular resources.

23. The network node according to claim 19, further configured to transmit the at least one subset of downlink cellular resources to be preconfigured in the first UE to the first UE as part of a system information broadcast.

24. The network node according to claim 19, wherein the information indicating the second subset of downlink cellular resources comprises information indicating at least one subset of downlink cellular resources indicating resources to be used for transmitting RS in the D2D communication, and at least one subset of downlink cellular resources indicating resources to be used for transmitting payload data in the D2D communication.

\* \* \* \* \*